No. 786,766. PATENTED APR. 4, 1905.
J. G. HUNT.
PRUNING IMPLEMENT.
APPLICATION FILED DEC. 2, 1904.

Witnesses
E. F. Stewart
C. N. Woodward

John G. Hunt, Inventor.
by C. A. Snow & Co.
Attorneys

No. 786,766. Patented April 4, 1905.

UNITED STATES PATENT OFFICE.

JOHN G. HUNT, OF LENOX, MISSOURI, ASSIGNOR OF THREE-FOURTHS TO CHARLES A. CAPPS, OF BEULAH, MISSOURI, AND THOMAS C. McGIBONEY, OF LICKING, MISSOURI.

PRUNING IMPLEMENT.

SPECIFICATION forming part of Letters Patent No. 786,766, dated April 4, 1905.

Application filed December 2, 1904. Serial No. 235,238.

*To all whom it may concern:*

Be it known that I, JOHN G. HUNT, a citizen of the United States, residing at Lenox, in the county of Dent and State of Missouri, have invented a new and useful Pruning Implement, of which the following is a specification.

This invention relates to pruning implements, and has for its object to simplify and improve the construction and increase the efficiency and power of implements of this character.

With this and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages.

Figure 1:
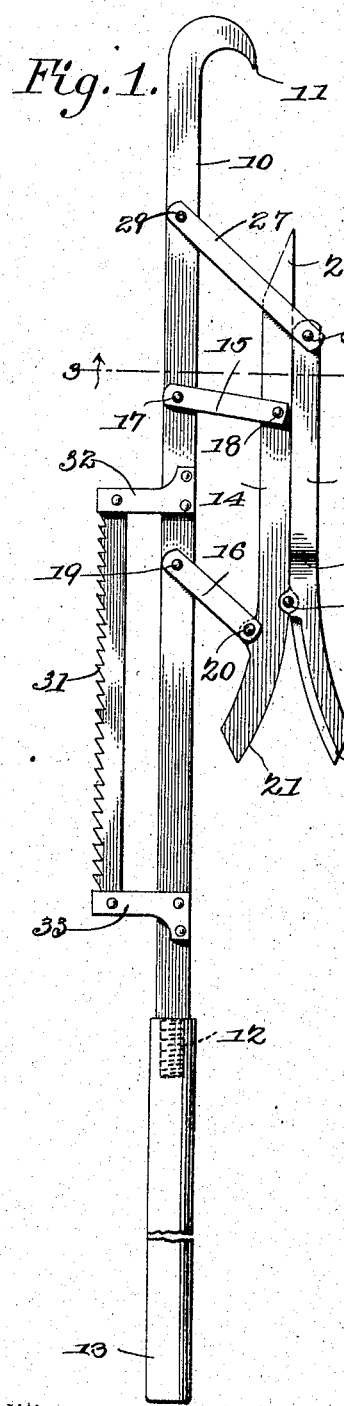
Figure 2:
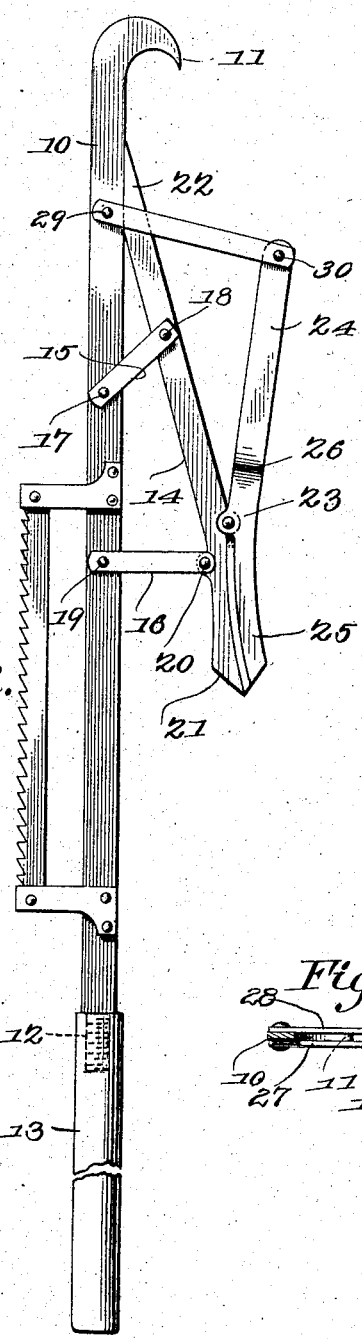
Figure 3:
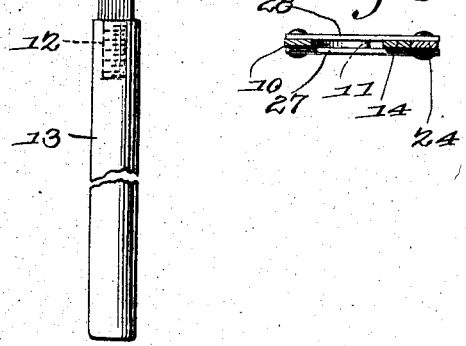

In the drawings thus employed, Figure 1 is a side elevation of the improved implement, illustrating the position of the parts before the pruning action. Fig. 2 is a similar view showing the position of the parts at the close of the action. Fig. 3 is a transverse section on the line 3 3 of Fig. 1.

The improved implement comprises a stock 10, having at one end a hook 11 and threaded at the other end, as at 12, for coupling to a handle 13 to enable handles of different lengths to be attached when required. A bar member 14 is coupled for movement longitudinally of the stock, as by spaced radius-links 15 16, the links preferably arranged in pairs and embracing opposite sides of the bar and stock and connected, as by pivots 17 18 19 20, the pivots 17 and 19 being preferably nearer together than the pivots 18 and 20, the purpose to be hereinafter explained. The bar 14 is formed with a shearing-surface 21 at one end and with the other end extended beyond the pivot-point 18, as at 22, and preferably inclined.

Pivoted at 23 to the bar 14 is a lever member 24, having a shear portion 25 at one end for operation in opposition to the shear portion 21 of the bar 14, the lever being offset, as at 26, so that the shear portion 25 overlaps the shear portion 21, and thus produces a "shear" or scissors-like action when the lever member is operated. The free end of the lever member is connected by radius-links 27 28 to the stock 10, as by pivots 29 30, these radius-links being of greater length than the radius-links 15 16. The extended end 22 of the bar 14 projects between the radius-bars 27 28 and is guided thereby and prevented from lateral displacement.

A saw 31 is connected to the stock 10, as by brackets 32 33.

By this arrangement when the implement is held in a substantially vertical position the members 14 24 will assume the position shown in Fig. 1 by gravity, with the shearing portions 21 25 distended or open and in position to be placed over the branch or limb to be severed. Then by drawing downward on the handle member the resistance offered by the limb will cause the parts to assume the position shown in Fig. 2 or forcibly closing the shearing portions and severing the limb. By reason of the difference in distance between the pivots 17 19 and the pivots 18 20 the extended end 22 of the bar 14 is moved toward the stock 10 when the downward movement is imparted until its inclined surface bears against the adjacent edge of the stock, as shown in Fig. 2, and thus forms a positive stop to check the further lateral movement. So soon as the limb is severed and the resistance removed the parts will at once automatically resume their former position, as in Fig. 1, ready for the next action.

The device may be of any desired size and will preferably be of steel, except the handle member 13, which may be wood, with a metal ferrule to receive the threaded end 12 of the stock.

Having thus fully described the invention, what is claimed is—

1. In a pruning implement, the combination of a stock, a bar disposed alongside the stock and connected thereto to permit endwise and tiltable movements of the bar, a lever disposed alongside of the bar and fulcrumed intermediate of its ends thereon, corresponding ends of the bar and lever having coöperating shear-blades, and a link pivotally connecting the other end of the lever with the stock.

2. In a pruning implement, a stock member, a bar having at one end a shearing-surface and coupled to said stock by spaced radius-links, a lever member having at one end an opposing shearing-surface, said bar and lever pivotally united intermediately of their lengths, and a radius-link of greater length than said spaced radius-links and pivoted by the ends respectively to said stock and the free end of said lever member.

3. In a pruning implement, the combination of a stock, a bar having a shear-blade, a pair of links having their opposite ends pivotally connected to the stock and the bar, the pivotal connections between the links and the stock being spaced at a less interval than the interval between the pivotal connections of the links and the bar, a lever fulcrumed intermediate of its ends upon the bar and provided with a shear-blade coöperating with the shear-blade of the bar, and a link pivotally connected at its opposite ends to the free end of the lever and the stock.

4. In a pruning implement, the combination of a stock, a bar provided with a terminal shear-blade, spaced links pivotally connected at opposite ends to the bar and the stock with the pivots uniting the links and the stock spaced at a less interval than the pivots uniting the links and the bar, the free end of the bar being formed to bear against the stock and limit the movement of the bar, a lever fulcrumed intermediate of its ends upon the bar and provided with a terminal shear-blade coöperating with the shear-blade of the bar, and a link pivotally connecting the opposite end of the lever with the stock.

5. In a pruning implement, the combination of a stock, a bar provided at one end with a shear-blade, spaced links pivotally connected at opposite ends to the bar and the stock with the pivots uniting the links to the stock nearer together than the pivots uniting the links to the bar, the other end of the bar being extended beyond the adjacent link and formed to bear against the stock at one limit of the movement of the bar, a lever fulcrumed intermediate of its ends upon the bar and provided with a terminal shear-blade in coöperative relation with the shear-blade of the bar, and links embracing the other end of the lever and the stock and pivotally connected to said members.

In testimony that I claim the foregoing as my own I have hereto affixed my signature in the presence of two witnesses.

JOHN G. HUNT.

Witnesses:
   N. J. NEDRAL,
   I. F. DAVIS.